(12) United States Patent
Reinpoldt, III

(10) Patent No.: US 10,417,516 B2
(45) Date of Patent: Sep. 17, 2019

(54) SYSTEM AND METHOD FOR PREPROCESSING IMAGES TO IMPROVE OCR EFFICACY

(71) Applicant: VASTEC, INC., Tampa, FL (US)

(72) Inventor: Willem H. Reinpoldt, III, Tarpon Springs, FL (US)

(73) Assignee: VASTEC, INC., Tampa, FL (US)

( * ) Notice: Subject to any disclaimer, the term of this patent is extended or adjusted under 35 U.S.C. 154(b) by 93 days.

(21) Appl. No.: 15/685,503

(22) Filed: Aug. 24, 2017

(65) Prior Publication Data

US 2019/0065882 A1 Feb. 28, 2019

(51) Int. Cl.
*G06K 9/00* (2006.01)
*G06K 9/34* (2006.01)
*G06K 9/32* (2006.01)

(52) U.S. Cl.
CPC .......... *G06K 9/344* (2013.01); *G06K 9/3283* (2013.01)

(58) Field of Classification Search
CPC ...... G06K 9/18; G06K 9/00449; G06K 9/222; G06K 9/4604; G06K 9/342; G06K 2209/01; G06K 9/344; G06K 9/3283; G06F 17/212
See application file for complete search history.

(56) References Cited

U.S. PATENT DOCUMENTS

| | | | |
|---|---|---|---|
| 4,558,461 A | 12/1985 | Schlang | |
| 5,392,130 A * | 2/1995 | Mahoney | G06K 9/00449 358/400 |
| 6,046,740 A * | 4/2000 | LaRoche | G06K 9/00476 715/764 |
| 9,063,911 B2 * | 6/2015 | Levy | G06F 17/211 |
| 2003/0097384 A1 | 5/2003 | Hu et al. | |
| 2006/0209333 A1 * | 9/2006 | Takida | G07C 13/02 358/1.15 |
| 2008/0107337 A1 | 5/2008 | Furmaniak et al. | |
| 2010/0054585 A1 | 3/2010 | Guillou et al. | |
| 2010/0174985 A1 * | 7/2010 | Levy | G06F 17/211 715/244 |
| 2010/0303356 A1 | 12/2010 | Fosseide et al. | |
| 2011/0271177 A1 * | 11/2011 | Bastos dos Santos | G06F 17/243 715/256 |
| 2012/0177295 A1 | 7/2012 | Gronau et al. | |
| 2012/0179468 A1 | 7/2012 | Nestares | |
| 2013/0259314 A1 | 10/2013 | Kozitsky et al. | |

(Continued)

*Primary Examiner* — Amir Alavi
(74) *Attorney, Agent, or Firm* — Matthew G. McKinney, Esq.; Allen, Dyer et al.

(57) ABSTRACT

A system to preprocess images to increase accuracy of optical character recognition (OCR) includes a processor, and a memory coupled to the processor. The processor is configured to scan an electronically stored representation of a whole or partial document, identify an image in the electronically stored representation, and recognize row-based text within the electronically stored representation. In addition, the processor is configured to align the row-based text vertically, generate a resultant electronically stored representation of the whole or partial document having the row-based text aligned, and save the resultant electronically stored representation for subsequent OCR processing. The electronically stored representation of the whole or partial document may contain at least one image having a JPG, TIF, GIF, PNG, or BMP, type of format.

19 Claims, 10 Drawing Sheets

(56) References Cited

U.S. PATENT DOCUMENTS

| | | | |
|---|---|---|---|
| 2015/0066895 A1* | 3/2015 | Komissarchik | G06F 16/5846 |
| | | | 707/709 |
| 2015/0138220 A1 | 5/2015 | Chapman et al. | |
| 2016/0179764 A1 | 6/2016 | Kelso et al. | |
| 2016/0188541 A1 | 6/2016 | Chulinin | |
| 2016/0203625 A1 | 7/2016 | Khan et al. | |
| 2017/0154232 A1* | 6/2017 | Hammen | G06K 9/222 |
| 2017/0220989 A1* | 8/2017 | King | B66F 9/0755 |
| 2017/0372156 A1* | 12/2017 | Kalenkov | G06F 17/212 |
| 2018/0276462 A1* | 9/2018 | Davis | G06K 9/00449 |

\* cited by examiner

| | | | AFFECTED DOCUMENTS | |
|---|---|---|---|---|
| Author Initial | Document Control Number | Publication Date | Name or Applicant Cited on Document | Chapters, Sections, Pages, Paragraphs or Lines Affected |
| | 2001-1492 | 7/19/2001 | Goldman, Oscar | |
| | 2001-1493 | 7/20/2001 | Greenville, Christopher and Associates | |
| | 2001-1494, 2001-9756 | 7/21/2001 | Goldman, Oscar | |
| | 2001-1495 | 7/22/2001 | Wellwood, Ottie | |
| | 2001-1496 | 7/23/2001 | Little, Joseph | |
| | 2001-1497 | 7/24/2001 | Westmoreland, Stephen Atwood Esquire | |
| | 2001-1498 | 7/25/2001 | Simmons, Carie | |
| | 2001-1499 | 7/26/2001 Revised | Stallone, Gray J. | |
| | 2001-1500 | 7/27/2001 | Jackson, Lemar | |
| | 2001-1501, 2001-9930 | 7/28/2001 | Sabastian, Paulene | |
| | 2001-1502 | 7/29/2001 | Overstreet, Jose | |
| | 2001-1503 | 7/30/2001 | Longwood, Harry and Underhill, Jack | |
| | 2001-1504 | 7/31/2001 | Mansfield, Arnold | |
| | 2001-1505 | 8/1/2001 | Lavar, Jason | |
| | 2001-1506 | 8/2/2001 | Shatner, Victor | |
| | 2001-1507 | 8/3/2001 | Abrams, Jill | |
| | 2001-1498 | 7/25/2001 | Simmons, Carie | |
| | 2001-1499 | 7/26/2001 | Stallone, Gray J. | |
| | 2001-1500 | 7/27/2001 | Jackson, Lemar | |
| | 2001-1501, 2001-9930 | 7/28/2001 | Sabastian, Paulene | |
| | 2001-1502 | 7/29/2001 | Overstreet, Jose | |

INFORMATION STATEMENT BY APPLICANT

| Application Number | 12-127-4332 |
|---|---|
| Filing Date | 7-Nov-16 |
| First Named Applicant | Davis, John |
| Group Units | 3622, 08854, 13-7456, 34688, 34788 |
| Supervisor Name | Carlson, Kathy |
| Docket Number: | 901P57 |

Examiner:     Date Considered:

FIG. 1

| INFORMATION STATEMENT BY APPLICANT | | Application Number | 12-127-4332 |
|---|---|---|---|
| | | Filing Date | 7-Nov-16 |
| | | First Named Applicant | Davis, John |
| | | Group Units | 3622, 06854, 13-7456, 34688, 34786 |
| | | Supervisor Name | Carlson, Kathy |
| Sheet 1 of 10 | | Docket Number | 301P57 |

| AFFECTED DOCUMENTS | | | | |
|---|---|---|---|---|
| Author Initial | Document Control Number | Publication Date | Name of Applicant Cited on Document | Chapters, Sections, Pages, Paragraphs or Lines Affected |
| | 2001-1492 | 7/19/2001 | Goldman, Oscar | |
| | 2001-1493 | 7/20/2001 | Greenville, Christopher and Associates | |
| | 2001-1494, 2001-3756 | 7/21/2001 | Goldman, Oscar | |
| | 2001-1495 | 7/22/2001 | Wellwood, Ottie | |
| | 2001-1496 | 7/23/2001 | Little, Joseph | |
| | 2001-1497 | 7/24/2001 | Westmoreland, Stephen Atwood Esquire | |
| | 2001-1498 | 7/25/2001 | Simmons, Carie | |
| | 2001-1499 | 7/26/2001 Revised | Stallone, Gray J. | |
| | 2001-1500 | 7/27/2001 | Jackson, Lemar | |
| | 2001-1501, 2001-3930 | 7/28/2001 | Sabastian, Paulene | |
| | 2001-1502 | 7/29/2001 | Overstreet, Jose | |
| | 2001-1503 | 7/30/2001 | Longwood, Harry and Underhill, Jack | |
| | 2001-1504 | 7/31/2001 | Mansfield, Arnold | |
| | 2001-1505 | 8/1/2001 | Lavar, Jason | |
| | 2001-1506 | 8/2/2001 | Shatner, Victor | |
| | 2001-1507 | 8/3/2001 | Abrams, Jill | |
| | 2001-1498 | 7/25/2001 | Simmons, Carie | |
| | 2001-1499 | 7/26/2001 | Stallone, Gray J. | |
| | 2001-1500 | 7/27/2001 | Jackson, Lemar | |
| | 2001-1501, 2001-3930 | 7/28/2001 | Sabastian, Paulene | |
| | 2001-1502 | 7/29/2001 | Overstreet, Jose | |
| Examiner: | | | Date Considered: | |

FIG. 2

| 300 | INFORMATION STATEMENT BY APPLICANT | | Application Number | 12-127-4332 |
|---|---|---|---|---|
| | | | Filing Date | 7-Nov-16 |
| | | | First Named Applicant | Davis, John |
| | | | Group Units | 3622, 08854, 13-7456, 34688, 34786 |
| 320 | | | Supervisor Name | Carlson, Kathy | 322
| | Sheet 1 of 10 | | Docket Number: 901P57 | |

| | | 332 — AFFECTED DOCUMENTS | | |
|---|---|---|---|---|
| Author Initial | Document Control Number | Publication Date | Name or Applicant Cited on Document | Chapters, Sections, Pages, Paragraphs or Lines Affected |
| | 2001-1492 | 7/19/2001 | Goldman, Oscar | |
| | 2001-1493 | 7/20/2001 | Greenville, Christopher and Associates | |
| | 2001-1494, 2001-9758 | 7/21/2001 | Goldman, Oscar | |
| | 2001-1495 | 7/22/2001 | Wellwood, Ottie | |
| | 2001-1496 | 7/23/2001 | Little, Joseph | |
| | 2001-1497 | 7/24/2001 | Westmoreland, Stephen Atwood Esquire | |
| | 2001-1498 | 7/25/2001 | Simmons, Carie | |
| | 2001-1499 | 7/26/2001 Revised | Stallone, Gray J. | |
| | 2001-1500 | 7/27/2001 | Jackson, Lemar | |
| | 2001-1501, 2001-9930 | 7/28/2001 | Sabastian, Paulene | |
| | 2001-1502 | 7/29/2001 | Overstreet, Jose | |
| | 2001-1503 | 7/30/2001 | Longwood, Harry and Underhill, Jack | |
| | 2001-1504 | 7/31/2001 | Mansfield, Arnold | |
| | 2001-1505 | 8/1/2001 | Lavar, Jason | |
| | 2001-1506 | 8/2/2001 | Shatner, Victor | |
| | 2001-1507 | 8/3/2001 | Abrams, Jill | |
| | 2001-1498 | 7/25/2001 | Simmons, Carie | |
| | 2001-1499 | 7/26/2001 | Stallone, Gray J. | |
| | 2001-1500 | 7/27/2001 | Jackson, Lemar | |
| | 2001-1501, 2001-9930 | 7/28/2001 | Sabastian, Paulene | |
| | 2001-1502 | 7/29/2001 | Overstreet, Jose | |

| Examiner: | Date Considered: |
|---|---|

SYSTEM AND METHOD FOR PREPROCESSING IMAGES TO IMPROVE OCR EFFICACY

TECHNICAL FIELD

The present invention relates to the field of Optical Character Recognition (OCR) software, and in particular to a method for improving the efficacy of OCR software.

BACKGROUND

Optical Character Recognition software was introduced in the 1970's and involves the conversion of scanned images of printed or typewritten text into computer-readable text using computer software and/or algorithms.

Image preprocessing is often a desirable step before OCR. With an image preprocessing step, the image can be optimized prior to OCR so as to improve OCR efficacy. Typical image preprocessing operations include de-speckle, which removes extraneous noise from the image, de-skew, which straightens tilted images, and binarization, which converts the image from color or gray scale to a black-and-white "binary" image.

To convert image-based text into characters, internal OCR software algorithms typically scan images using successive horizontal scans similar to how a fax machine scans a page or an ink-jet printer prints a page. Each horizontal scan of the width of the page is termed a raster and OCR software will analyze rasters from the top of the page to the bottom of the page. Margins and vertical white space (leading) are ignored until a raster containing valid image data (often black text pixels versus white background pixels) are detected. Character recognition then begins assembling rows of pixels representing text by accumulating subsequent rasters vertically until vertical white space/leading is again detected indicating a line or "row" of text has been found and the accumulated pixel data is ready for character-by-character processing of the row of text.

The recognition process traverses the row of text, segmenting the row into individual components of connected black pixels separated by white space. These components are candidates for character recognition.

For each component that is recognized as containing a character, various information is collected such as the alphabet letter, the point-size and other font characteristics of the character, the confidence percentage of the recognition, and the bounding rectangle containing the character.

Ideally, the rows of text in the image are neatly aligned so that any particular raster bisects text uniformly within the row. For example, a raster scanning horizontally might bisect text at its baseline, or at the middle of the character heights, or at the top of the characters consistently along the line of text. In this case, the text is considered vertically aligned.

In some cases, rows of text in the image are not neatly aligned, and a raster might bisect different characters at different heights since the character placement on the image varies. Such is the case in Example 1 where a raster might bisect adjacent characters at differing heights. In this case, the text is considered not vertically aligned.

|  |  |  |  |  | Example 1 |
|---|---|---|---|---|---|
| The | quick | brown | | jumps | over | the | | dog |
| | | | fox | | | | lazy | |

OCR software which scans using the raster approach can experience difficulty with non-vertically aligned text within the same row, producing erroneous OCR results. This can occur if there is no consistent white space marking the start and end of a line of text in the row and the raster can be fractured. Sophisticated algorithms could be conceivably designed as part of the OCR software to accommodate non-vertically aligned text rows, but few if any commercially available OCR software packages have implemented these algorithms, and such remediation would necessarily require new software releases.

Non-vertically aligned row-based text is often observed in forms documents, spreadsheets and tabular data. These document types may or may not contain graphical cell borders delineating the edges of one or more cells. These documents are often generated on computers having the ability to justify text vertically. For example, a cell containing a single line of text would have the text appear vertically centered with equal white space above and below the centered text whereas two lines of text within a table cell would appear vertically distributed with white space appearing above line one, between lines one and two (in the vertical center of the cell separating the two lines of text), and below line two. Comparing these two examples then shows text in the vertical center of the cell with a single line of text and white space in the vertical center of the cell with two lines of text as in Example 2.

| 3. Thomas Jefferson (1801-1809) | Aaron Burr (1801-1805) |
|---|---|
| | George Clinton (1805-1809) |

Most legacy and contemporary OCR software programs have difficulties with this non-vertical alignment of text within rasters. Artifacts generated by the OCR software due to this difficulty can include, but not be limited to, mis-read text, double-read text and missing text. This can greatly affect the quality and integrity of the OCR generated output, especially with certain documents such as forms, spreadsheets and tabular data that contain a large occurrence of non-vertically aligned text.

A solution to improving the efficacy of OCR for non-vertically aligned text is to preprocess the image(s) so that text is vertically aligned prior to conventional OCR. Accordingly there is a need in the relevant art for a system and method for preprocessing images in such a fashion to vertically align text prior to OCR, thus providing higher quality OCR output.

There is also a need in the art for the system to preprocess the image so that text is vertically aligned prior to OCR to be implemented either internal to the OCR software or external to the OCR software, the latter eliminating the need for updated OCR software containing this functionality to be developed, thus potentially saving cost and time.

There is also a need in the art for a system that can be added to current OCR work flows instead of requiring the entire OCR solution to be replaced or upgraded to add this functionality.

Another need exists in the art for the preprocessing algorithm to vertically align raster text so that said algorithm can integrate into existing image preprocessing or OCR software so as to optimize performance of the preprocessing or OCR process in terms of speed, memory usage and other processing resource demands.

However, in view of the prior art at the time the present invention was made, it was not obvious to those of ordinary skill in the pertinent art how the identified needs could be fulfilled.

SUMMARY

In view of the foregoing background, it is therefore an object of the present invention to increase the accuracy of converting documents using OCR technology, while at the same time using less memory and without decreasing processor speed.

This and other objects, features, and advantages in accordance with the present invention are provided by a system to preprocess images to increase accuracy of optical character recognition (OCR). The system includes a processor, and a memory coupled to the processor. The processor is configured to scan an electronically stored representation of a whole or partial document, identify an image in the electronically stored representation, and recognize row-based text within the electronically stored representation. In addition, the processor is configured to align the row-based text vertically, generate a resultant electronically stored representation of the whole or partial document having the row-based text aligned, and save the resultant electronically stored representation for subsequent OCR processing. The electronically stored representation of the whole or partial document may contain at least one image having an image format including, but not limited to, JPG, TIF, GIF, PNG, or BMP, type of format.

Another aspect is directed to a method to preprocess images to increase accuracy of optical recognition (OCR). The method includes scanning a representation of a whole or partial document stored in a memory, identifying an image in the electronically stored representation using a processor coupled to the memory, and recognizing row-based text within the electronically stored representation using the processor. The method also includes aligning the row-based text vertically using the processor, and saving the resultant electronically stored representation of the whole or partial document in the memory for subsequent OCR processing. In addition, the processor is configured to operate using on-demand single image conversions, continuous-bulk image conversions, or both.

BRIEF DESCRIPTION OF THE DRAWINGS

FIG. 1 is an illustration of a Form document before vertical alignment of text wherein some table headers and cell data are unaligned;

FIG. 2 is an illustration of a Form document before vertical alignment of text wherein some table headers and cell data are unaligned, with gray backgrounds illustrating adjacent cells where OCR errors have a high probability of occurring;

FIG. 3 is an illustration of a Form document after vertical alignment of text wherein table headers and cell data vertically aligned, according to an embodiment of the present invention;

FIG. 4 is an illustration of a Spreadsheet document before vertical alignment of text wherein some cell data is unaligned;

DETAILED DESCRIPTION

Figure 5:
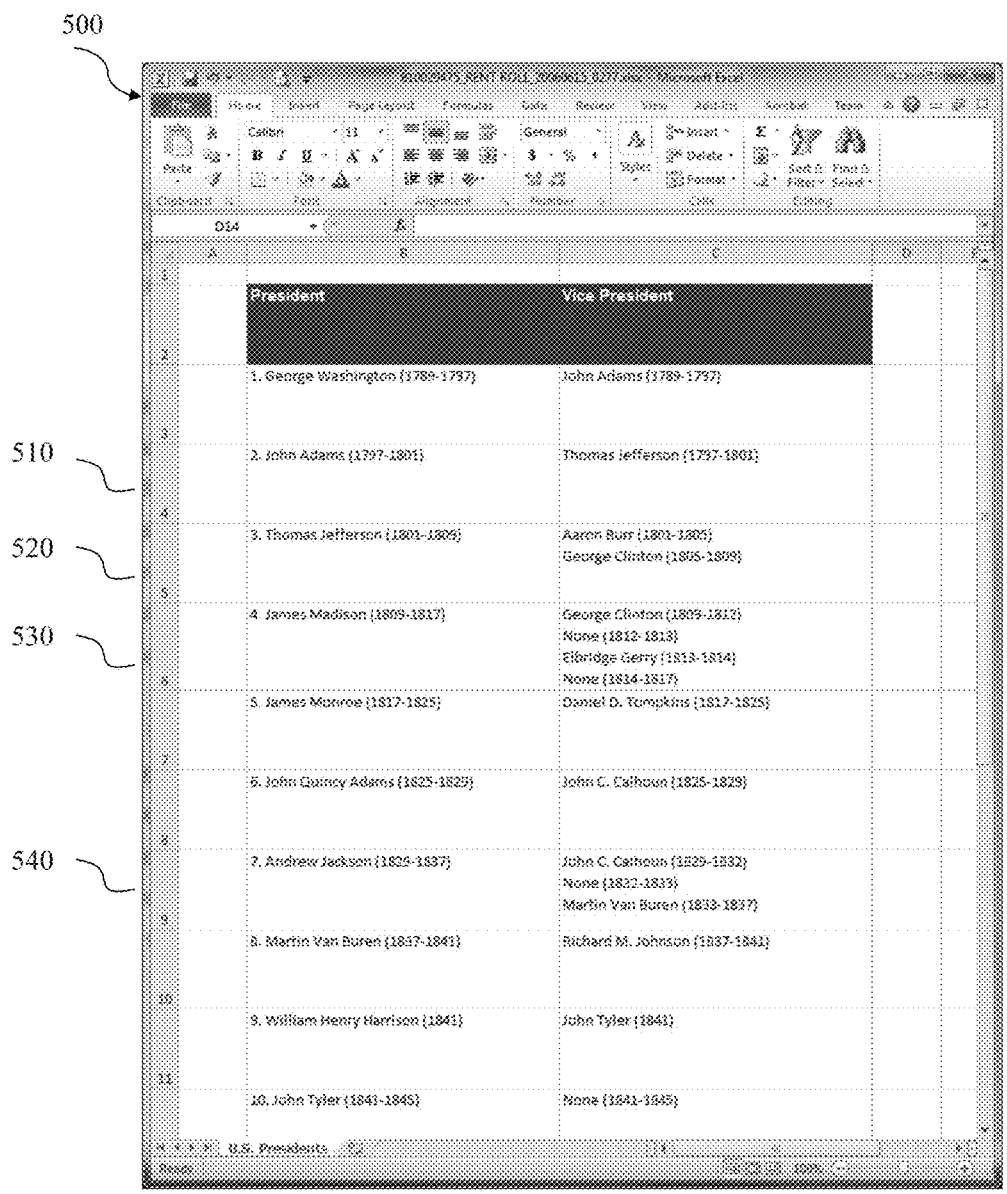
FIG. 5 is an illustration of a Spreadsheet document after vertical alignment of text wherein cell data is vertically aligned, according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In a particular embodiment, a method for the vertical alignment of row-based text during preprocessing of images in preparation for OCR is disclosed. The method provides for the vertical translation (movement) of a subset of pixels representing text within the image so that the resultant image contains row-based text that is vertically aligned. The method allows for more accurate OCR of the preprocessed image than achievable without the preprocessing stage.

The method addresses a weakness in contemporary OCR software packages which are typically based on raster (horizontal) scanning of content along the width of the image and utilize a common baseline for text within the raster. The raster approach encounters difficulties if the content is not vertically aligned into text rows causing a common baseline for text within the raster to become erroneous or unpredictable for non-vertically aligned text as demonstrated by the line of text as illustrated below.

|  |  |  |  |  |  | Example 3 |
|---|---|---|---|---|---|---|
|  | quick |  |  | over |  |  |
| The |  | brown |  | jumps | the |  dog |
|  |  |  | fox |  |  | lazy |

In a particular embodiment, the method presently disclosed is realized as computerized OCR-preprocessor software preferably, but not necessarily, residing on the same computer as the OCR software. The OCR-preprocessor software pre-processes the OCR source images either singularly or in batch prior to OCR. One or more non-vertically aligned text images serve as input to the OCR-preprocessor software, which in turn generates corresponding new images, or modifies the original images, so that they contain vertically-aligned text for improved OCR conversion.

Referring to FIG. 1, an illustrative Form document (100) prior to vertical alignment of text is shown. The Form document (100) consists of a plurality of sections containing tabular data arranged in cells (110). Cells (110) may contain purely descriptive text (110, 112, 130, 132), data (114, 140) or a combination of the two (120, 122). The descriptive text and/or data may be contained in a single line of text (112, 120, 122, 132), or may occupy multiple lines of text (110, 114, 130, 140). Additionally, descriptive text and/or data may be vertically justified as top justified (110), center justified (112, 122, 132), bottom justified (120), full justified or some other justification or combination of justifications.

Additionally, the cells of illustrative Form document (100) may contain text using different fonts, font point sizes, font attributes (including but not limited to bold (110), italic, underline), horizontal spacing/kerning and vertical spacing/leading in any combination and which may affect the vertical alignment of text along the width of the image.

Referring to FIG. 2, the illustrative Form document (200) as presented in FIG. 1 (100) is artistically modified to include cell shading (210, 240) to indicate cells which are adjacent to other cells with differing vertical text alignment. These shaded cells (210, 240) are most likely to produce OCR conversion errors due to non-vertically aligned text between adjacent cells.

Referring to FIG. 3, the illustrative Form document (300) as presented in FIG. 1 (100) is shown after the computerized OCR-preprocessor software has executed, depicting how text has been top justified for each cell (320, 330, 332), including but not limited to previously bottom justified text (320), full justified text (330) and center justified text (332). With text justified by the OCR-preprocessor software, subsequent conversion of the image to text using OCR software will have increased efficacy, quality, effectiveness and performance (including but not limited to faster processing speed and reduced memory requirements) than images that have not been subject to the OCR-preprocessor software and does not contain vertically aligned text.

Figure 4:
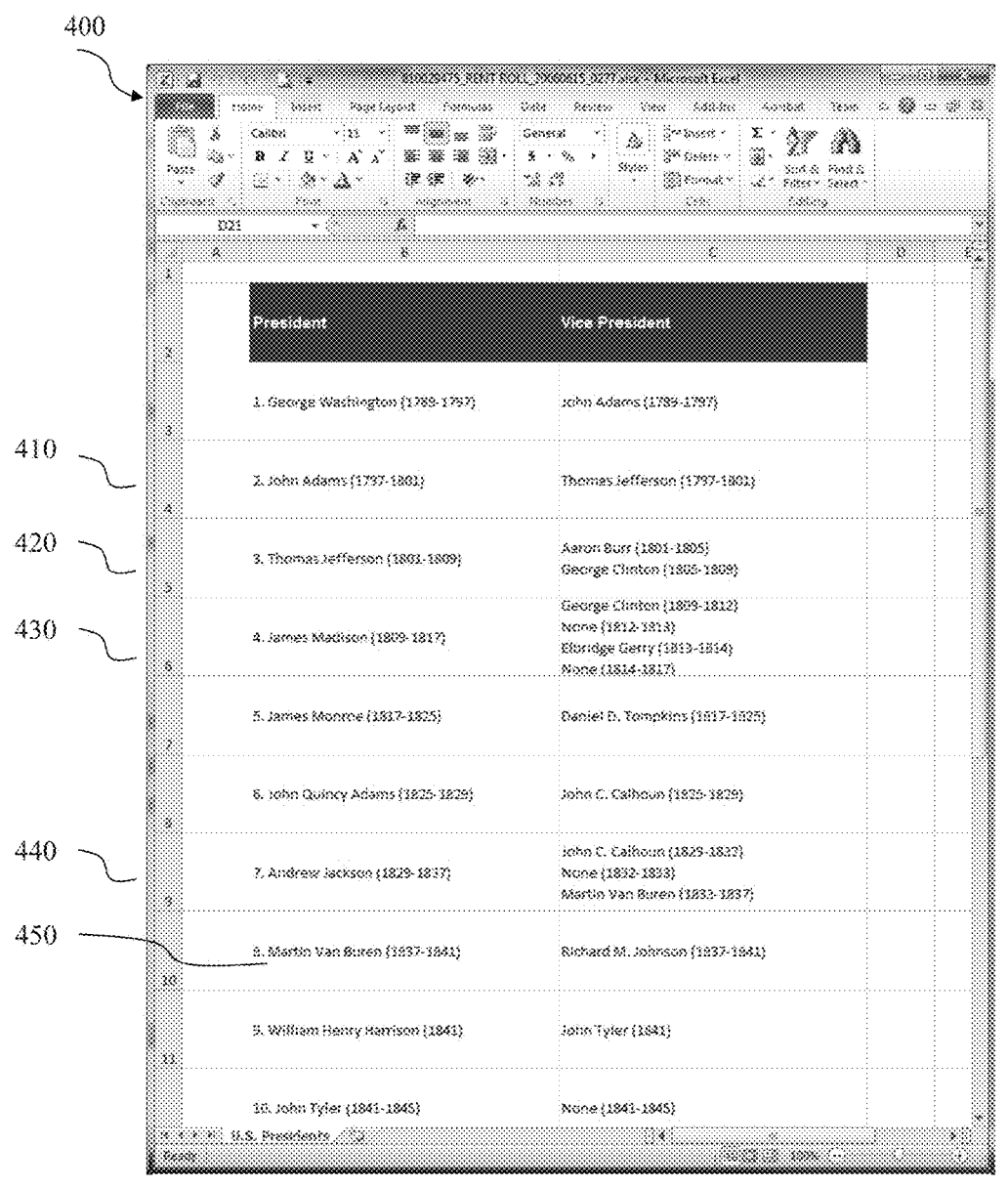

Referring now to FIG. 4, an illustrative spreadsheet (400) prior to vertical alignment of text is shown. The spreadsheet (400) contains rows of data that have cells containing the same number of lines of text and are aligned vertically (410) and contains rows of data that have cells containing a differing number of lines of text and are not aligned vertically (420, 430). The spreadsheet (400) also contains an example of a row of data that has cells with differing lines of text (440) but where the text is vertically aligned in this instance.

Referring to FIG. 5, the same illustrative spreadsheet (500) as presented in FIG. 4 (400) is shown after the computerized OCR-preprocessor software has been executed, depicting how text has been top justified for each cell (510, 520, 530, 540). With text justified by the OCR-preprocessor software, subsequent conversion of the image to text using OCR software will have increased efficacy, quality, effectiveness and performance (including but not limited to faster processing speed and reduced memory requirements) than images that have not been subject to the OCR-preprocessor software and do not have vertically aligned text.

Figure 6:
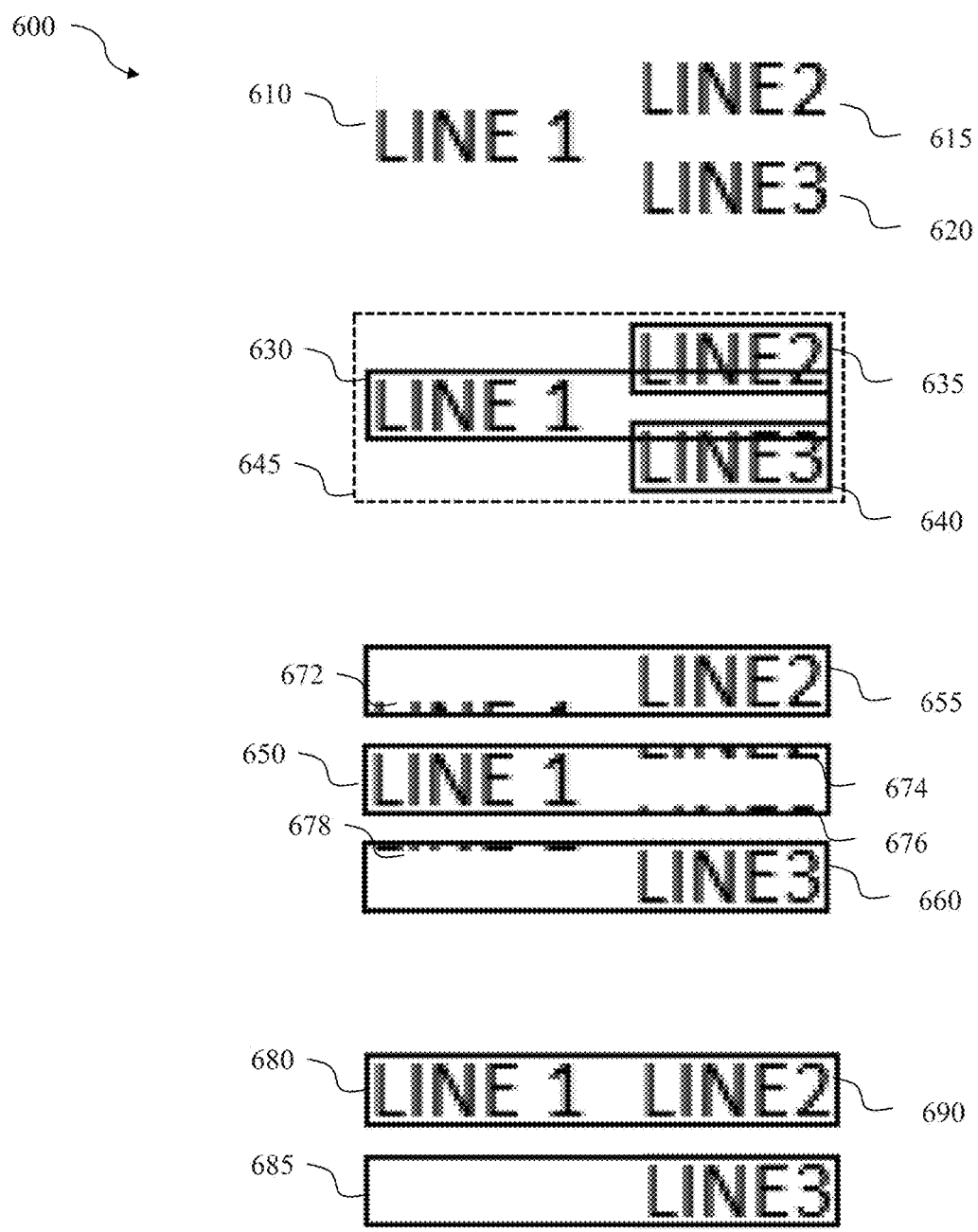
FIG. 6 contains illustrations of how raster scanning can divide text pixels of non-vertically aligned text.

Referring to FIG. 6, the mechanism used by typical OCR software programs to rasterize text is shown (600). At the top of FIG. 6, three lines of text (610, 615, 620) are presented with text line 610 not vertically aligned with text lines 620 and 630. In fact, text line 610 is positioned half way between text lines 620 and 630 in the vertical sense. As OCR software rasterizes an image in preparation for OCR, it typically calculates bounding boxes for text in each line. These calculated bounding boxes are graphically shown as the boxes 630, 635 and 640 encompassing text lines 610, 615 and 620 respectively. Since text line 610 is not vertically aligned, its corresponding calculated bounding box 630 intersects those of text lines 615 and 620, bisecting the text characters and their bounding boxes 635 and 640.

Calculated bounding boxes 630, 635 and 640 encompassing text lines 610, 615 and 620 respectively are redrawn in FIG. 6 as calculated bounding boxes 650, 655 and 660 respectively with illustrative spacing added artificially to graphically differentiate the text rasterization process used by typical OCR software. The calculated bounding boxes 650, 655 and 660 around text lines 610, 615 and 620 respectively are elongated to more accurately depict the raster scan process used by typical OCR software. In this case, it is shown how a portion of text line 610 is included in calculated bounding boxes 655 and 660 resulting in artifacts 672 and 678, respectively. Additionally, a portion of text lines 615 and 620 are included in calculated bounding box 650 resulting in artifacts 674 and 676, respectively.

A cause of OCR errors due to non-vertically aligned text involves the possibility of typical OCR software skipping a non-vertically aligned text line. In this case, once typical OCR software would raster and calculate the bounding box for a previous text line (e.g., 635), typical OCR software will automatically advance past the next region of vertical white space/leading before rasterizing subsequent scans. In this example, typical OCR software with this attribute would advance from text line 635 past the bottom of collective bounding box 645 before encountering a raster of non-text white space/leading before resuming OCR and thusly potentially skip text lines 610 and 620 completely.

Another cause of OCR errors due to non-vertically aligned text involves the presence of artifacts 672, 674, 676 and 678 within the calculated bounding boxes of adjacent text lines. In this case, the extraneous partial text characters could potentially be misconstrued as 1) punctuation or other character data leading to inserted fictitious characters, or 2) unrecognized text data leading to OCR confidence errors or unidentified character marks ("?"). For example, artifact 672 viewed from the viewpoint of bounding box 655 might be misconstrued as four periods, an underscore, a space and a comma (. . . . _,) by typical OCR software.

At the bottom of FIG. 6, the original text lines 610, 615 and 620 are contained within calculated bounding boxes 680 and 685 where text lines 610 and 615 have been vertically aligned using the method described in the disclosure so as to occupy a single calculated bounding box 680. With the formally separate text line 610 aligned to the same vertical position as text line 615, the subsequent OCR process will create a bounding box around both text lines 610 and 615 which now share alignment 680, providing a much improved chance of correct OCR conversion for reasons including, but not limited to elimination of calculated bounding box artifacts 672, 674, 676 and 678, and introduction of vertical white space/leading between calculated bounding boxes 680 and 685.

Figure 7:
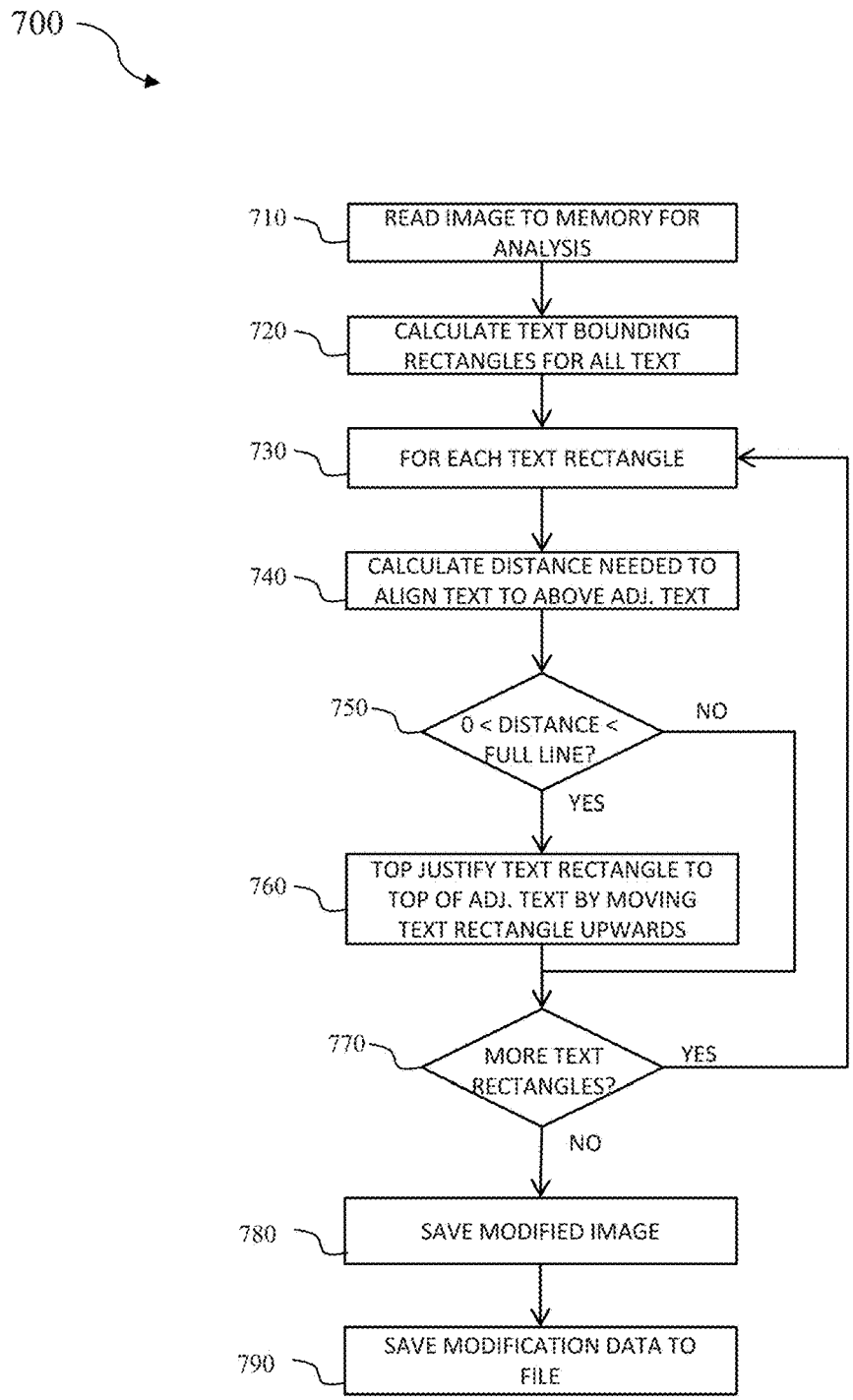
FIG. 7 is an illustration of a process flow chart of an approach for vertical alignment of text, according to an embodiment of the present invention.

Referring now to FIG. 7, a block diagram for a particular embodiment of the method for the vertical alignment of row-based text during preprocessing of images in preparation for OCR is presented (700).

The process begins with the typically automated input of the image file(s) in need of pre-processing (710). This step typically leverages a mechanism for designating which file or files are in need of pre-processing such as, but not limited to, specifying files using a Graphical User Interface (GUI) dialog box based file selector, specifying files listed in a secondary file (e.g., .BAT, .TXT, .XML), specifying files programmatically contained in an array of filenames, specifying memory streams, employing file drag-and-drop from the desktop, and storing files in an Inbox folder or specified directory of images to process. Regardless of the image selection mechanism, step 710 will sequentially read each image (or in parallel using Pipelining, Threading, Parallel Processing or similar programming techniques) and store the contents programmatically in a readily accessible and malleable format such as in a memory array for pre-processing.

Figure 8:
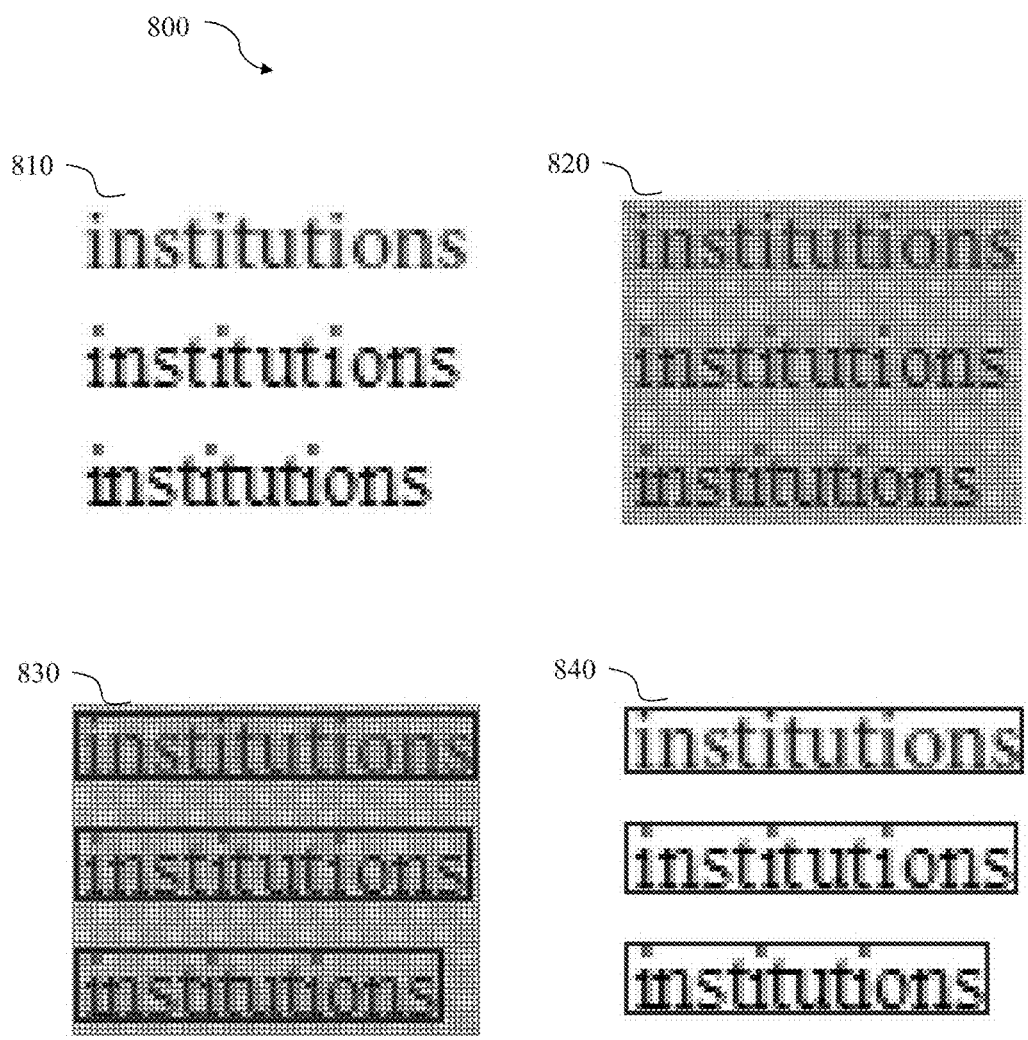
FIG. 8 is a diagram of a particular embodiment of a method for improving the efficacy of OCR by vertically aligning row-based text during image preprocessing, according to an embodiment of the present invention.

Pre-processing of the image begins with the detection and processing (720) of calculated bounding boxes such as those illustrated in FIG. 8 (840). The calculated bounding boxes (840) group letters, symbols, punctuation, words, sentences and/or lines together so that the resulting calculated bounding boxes (840) maximally represent the text appearing on a single line. Text that is not co-linear (not calculated to be residing on the same line) will have its own calculated bounding box assigned by step 720. For example, the text in 320 and 322 of FIG. 3 is co-linear, and would share the same calculated text bounding box due to shared dimensions and positioning of the text whereas the text in 120 and 122 of FIG. 1 is not co-linear and would require separate text rectangles (840).

Referring to FIG. 7 and FIG. 8, the method of algorithmically evaluating text rectangles (720) containing pixels representing text is illustrated (800). The pixels forming letters, symbols, punctuation, words, sentences or lines of text are evaluated with regard to their location, contrasting color from the background, and proximity to other text pixels (810). Pixels are considered background pixels if their color (black, white, gray level or actual color value) is equal or equivalent to the background color within a threshold value. Pixels are considered text pixels if their color (black, white, gray level or actual color value) is greater than a threshold value from background color.

By evaluating the pixels comprising the text (820) for location, color and proximity to other text pixels, the pixels can be grouped into lines of text (830). This grouping can be performed by a variety of algorithms such as Blob analysis or feature detection, or can be a function of a simple proximity detection to the nearest text pixel within a given threshold. For example, a threshold would be chosen such that the horizontal spacing between letters within a word would be within the threshold, thus including those text pixels in the current group, while the vertical spacing between pixels comprising separate lines would be outside of the threshold, thus excluding those text pixels from the current group.

The resulting text pixel groupings can then be represented by a calculated bounding box (840) minimally encompassing the group of related text pixels forming a letter, word, sentence or line of text. It is by this calculated bounding box (840) that vertical alignment can be calculated (e.g., the vertical spacing between calculated bounding boxes (840)) and corrective measures can be effected by shifting the vertical location of the text pixels within the calculated bounding box (840) to a new vertical location, in essence relocating the calculated bounding box upwards in the image.

Step 740 calculates the vertical separation of each calculated bounding box (840) with previously processed calculated bounding boxes. A vertical separation of zero indicates that the two calculated bounding boxes are vertically aligned. A vertical separation greater than a threshold value which specifies the expected line separation or leading, indicates that the two calculated bounding boxes are far enough separated vertically to warrant separate calculated bounding boxes and should not be algorithmically justified. A vertical separation greater than zero but less than the threshold value specifying the expected line separation or leading indicates that the calculated bounding box (840) should be moved upwards by the calculated vertical separation distance to bring it in vertical alignment, thus implementing top justification.

Once the calculated vertical separation distance from step 740 is determined to indicate alignment is required (750), step 760 provides the means of vertically aligning text by top justifying a calculated bounding box (840) and the pixels it encompasses so that vertical alignment of text is achieved. The calculated bounding box's (840) vertical alignment is calculated (740) (e.g., the vertical spacing between calculated bounding boxes (840)) and corrective measures are effected by shifting the vertical location of the text pixels within the calculated bounding box (840) upwards by the amount calculated in 740 thus bringing the calculated bounding box (840) into vertical alignment.

At step 770 the algorithm loops to step 730 to process each remaining calculated bounding box.

Upon completion of all previous steps, the modified image resulting from any alignment steps (760) is saved as the pre-processing output (780) and suitable for OCR.

Step 790 optionally records a list of modifications performed on the image to achieve vertical alignment of text, allowing for forensics, "undo" and restore capability. This list of modifications performed can be stored in memory or as a log file which can then be saved in a variety of formats depending on the application, including but not limited to .TXT, .XML, and .CSV.

Figure 9:
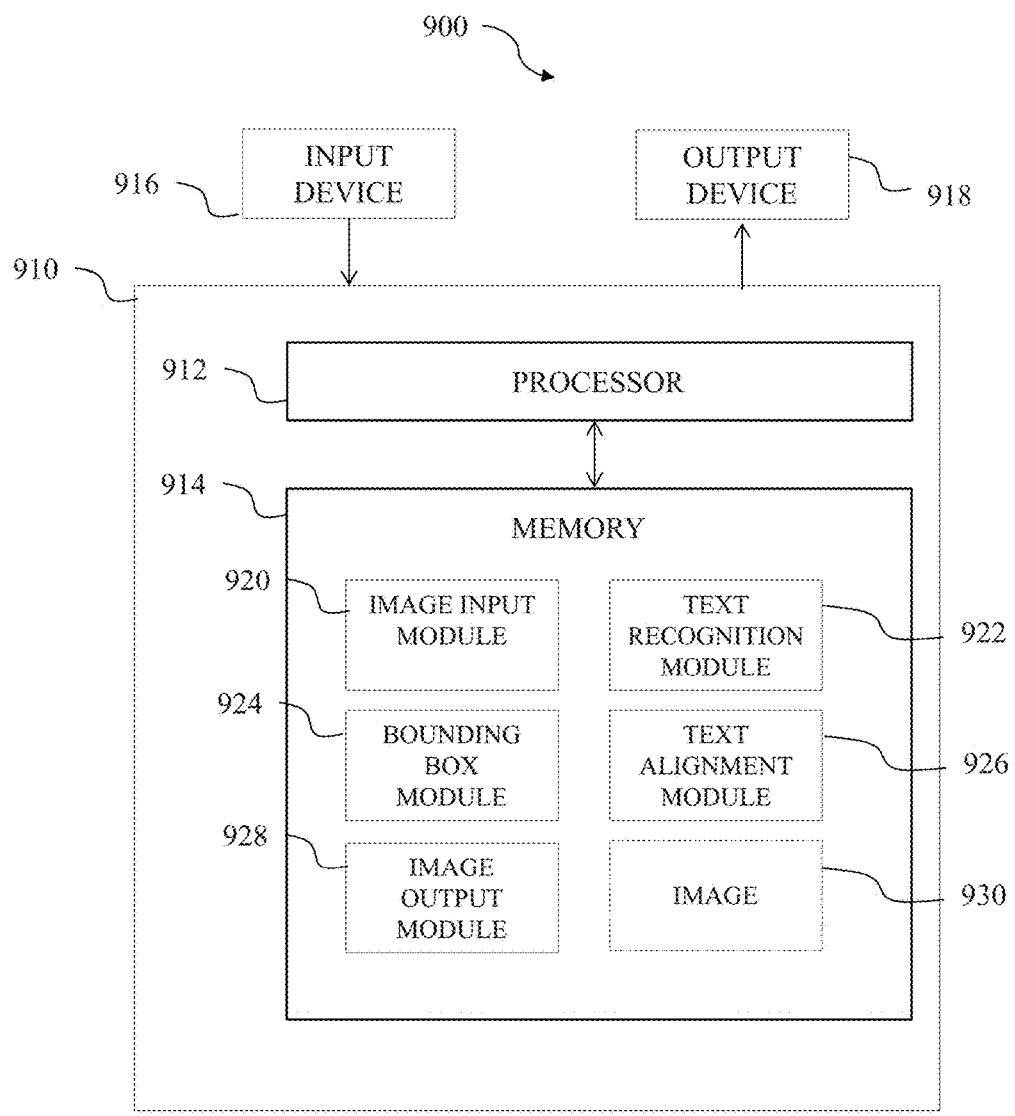
FIG. 9 is a block diagram of a particular illustrative embodiment of a method for improving the efficacy of OCR by vertically aligning row-based text during image preprocessing, according to an embodiment of the present invention.

Referring now to FIG. 9, a particular illustrative embodiment of a method to improve the efficacy of OCR by vertically aligning row-based text is depicted and generally designated 900.

The system 900 includes a processor 912 that is communication with an input device 916, where a memory 914 of a computer or server 910 may be adapted to store content of an electronic document 930. In a particular illustrative embodiment, the content of the electronic document 930 may include non-vertically aligned text. An image input module 920 may be used to input the at least one electronically stored document 930, a text recognition module 922 may be used to identify at least one textual object within the document 930, bounding box module 924 may be used to isolate the at least one textual object to generate a calculated bounding box of the at least one textual object, a text alignment module 926 may be used to align the at least one textual object to adjacent textual objects, and an image output module 928 may be used to save the results of the textual alignment to the output device 918 for later processing by external OCR software.

The modules 920, 922, 924, 926 and 928 may be implemented in hardware, firmware, software, other programmable logic, or any combination thereof. The memory 914 includes media that is readable by the processor 912 and that stores data and program instructions of the software modules 920, 922, 924, 926 and 928 that are executable by the processor 912. Additionally, the input device 916 may be a keyboard, mouse, light pen, track ball, track pad, joy stick, graphics tablet, touch screen, or other pointing device, or memory or image storage device, or any combination thereof that is accessible to the processor 912. Additionally, the system 900 may include a display, for example, a cathode ray tube (CRT) display, liquid crystal display (LCD), light emitting diode (LED) display, plasma display, or other display device that is accessible to the processor 912 to display the electronic image 930 to a user.

Figure 10:
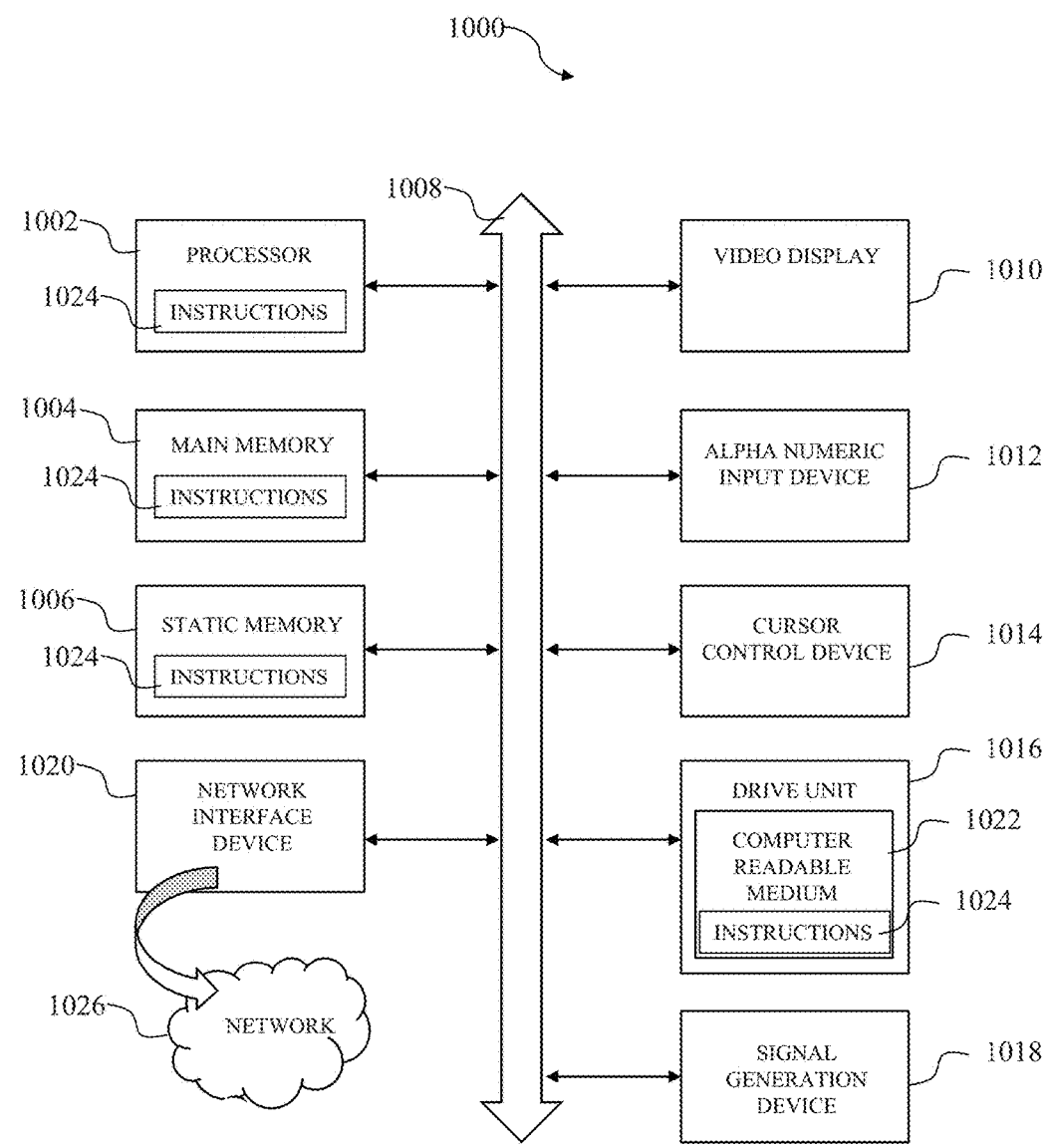
FIG. 10 is a diagram of a general computer system.

Referring now to FIG. 10, an illustrative embodiment of a general computer system is shown and is designated 1000. The computer system 1000 can include a set of instructions that can be executed to cause the computer system 1000 to perform any one or more of the methods or computer based functions disclosed herein. The computer system 1000, or any portion thereof, may operate as a standalone device or may be connected, e.g., using a network, to other computer systems or peripheral devices.

In a networked deployment, the computer system 1000 may operate in the capacity of a server, such as a video server or application server, or a media device. The computer system 1000 can also be implemented as or incorporated into various devices, such as a personal computer (PC), a personal digital assistant (PDA), a mobile device, a palmtop computer, a laptop computer, a desktop computer, a communications device, a wireless telephone, a web appliance, a network router, switch or bridge, or any other machine capable of executing a set of instructions (sequential or otherwise) that specify actions to be taken by that machine. In a particular embodiment, the computer system 1000 can be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics-processing unit (GPU), or both. Moreover, the computer system 1000 can include a main memory 1004 and a static memory 1006 that can communicate with each other via a bus 1008. As shown, the computer system 1000 may further include a video display unit 1010, such as a liquid crystal display (LCD), a flat panel display, a solid-state display, or a cathode ray tube (CRT). Additionally, the computer system 1000 may include an input device 1012, such as a keyboard, and a cursor control device 1014, such as a mouse. The computer system 1000 can also include a disk drive unit 1016, a signal generation device 1018, such as a speaker or remote control, and a network interface device 1020.

In a particular embodiment, as depicted in FIG. 10, the disk drive unit 1016 may include a computer-readable medium 1022 in which one or more sets of instructions 1024, e.g. software, can be embedded. Further, the instructions 1024 may embody one or more of the methods or logic as described herein. In a particular embodiment, the instructions 1024 may reside completely, or at least partially, within the main memory 1004, the static memory 1006, and/or within the processor 1002 during execution by the computer system 1000. The main memory 1004 and the processor 702 also may include computer-readable media.

The steps of a method or algorithm described in connection with the embodiments disclosed herein may be embodied directly in hardware, in a software module executed by a digital signal processor, microprocessor, or in any combination thereof. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

That which is claimed is:

1. A system to preprocess images to increase accuracy of optical character recognition (OCR), the system comprising:
    a processor;
    a memory coupled to the processor;
    the processor configured to
        scan an electronically stored representation of a whole or partial document;
        identify an image in the electronically stored representation of a whole or partial document;
        recognize row-based text within the electronically stored representation of a whole or partial document;
        align the row-based text vertically by calculating a first text bounding rectangle for a first portion of the row-based text;
        generate a resultant electronically stored representation of a whole or partial document having the row-based text aligned; and
        save the resultant electronically stored representation of a whole or partial document electronically for subsequent OCR processing.

2. The system of claim 1, wherein the electronically stored representation of a whole or partial document contains at least one image of a format type including but not limited to JPG, TIF, GIF, PNG, BMP, or any combination thereof.

3. The system of claim 1, wherein the resultant electronically stored representation of a whole or partial document contains at least one image of a format type including but not limited to JPG, TIF, GIF, PNG, BMP, or any combination thereof.

4. The system of claim 1, wherein the system is configured to operate using on-demand, continuous, single, or bulk image conversions, or any combination thereof.

5. The system of claim 1, wherein the row-based text is vertically aligned using top, center or bottom alignment, or any combination thereof.

6. A non-transitory processor readable medium having processor instructions that are executable to cause a processor coupled to a memory to:
    scan an electronically stored representation of a whole or partial document;
    identify one or more images in the electronically stored representation of a whole or partial document;
    recognize row-based text within the electronically stored representation of a whole or partial document;
    align the row-based text vertically by calculating a first text bounding rectangle for a first portion of the row-based text;
    generate a resultant electronically stored representation of a whole or partial document having the row-based text aligned; and
    save the resultant representation of a whole or partial document electronically for subsequent optical character recognition (OCR) processing.

7. The non-transitory processor readable medium of claim 6, wherein the electronically stored representation of a whole or partial document contains at least one image of a format type including but not limited to JPG, TIF, GIF, PNG, BMP, or any combination thereof.

8. The non-transitory processor readable medium of claim 6, wherein the resultant electronically stored representation of a whole or partial document contains at least one image of a format type including but not limited to JPG, TIF, GIF, PNG, BMP, or any combination thereof.

9. The non-transitory processor readable medium of claim 6, wherein the processor is configured to operate using on-demand, continuous, single, or bulk image conversions, or any combination thereof.

10. The non-transitory processor readable medium of claim 6, wherein the row-based text is vertically aligned using top, center or bottom alignment, or any combination thereof.

11. A method to preprocess images to increase accuracy of optical recognition (OCR), the method comprising:
   scanning a representation of a whole or partial document electronically stored in a memory;
   identifying an image in the electronically stored representation of a whole or partial document using a processor coupled to the memory;
   recognizing row-based text within the electronically stored representation of a whole or partial document using the processor;
   aligning the row-based text vertically by calculating a first text bounding rectangle for a first portion of the row-based text using the processor; and
   saving the resultant electronically stored representation of a whole or partial document in the memory for subsequent OCR processing.

12. The method of claim 11, wherein the electronically stored representation of a whole or partial document contains at least one image of a format type including but not limited to JPG, TIF, GIF, PNG, BMP, or any combination thereof.

13. The method of claim 11, wherein the resultant electronically stored representation of a whole or partial document contains at least one image of a format type including but not limited to JPG, TIF, GIF, PNG, BMP, or any combination thereof.

14. The method of claim 11, wherein the processor is configured to operate using on-demand, continuous, single or bulk image conversions, or any combination thereof.

15. The method of claim 11, wherein the row-based text is vertically aligned using top, center or bottom alignment, or any combination thereof.

16. The method of claim 11, wherein aligning the row-based text vertically comprises calculating a distance needed to align the first text bounding rectangle to an above adjacent text bounding rectangle.

17. The method of claim 16, wherein aligning the row-based text vertically comprises determining whether the distance is greater than zero and less than a threshold distance.

18. The method of claim 17, wherein aligning the row-based text vertically comprises top justifying the first text bounding rectangle to a top of the above adjacent text bounding rectangle by moving the first text bounding rectangle upwards when the distance is greater than zero and less than the threshold distance.

19. The method of claim 18, wherein aligning the row-based text vertically comprises shifting text pixels encompassed within the first text bounding rectangle.

* * * * *